(12) United States Patent
Yao

(10) Patent No.: US 10,308,790 B2
(45) Date of Patent: Jun. 4, 2019

(54) RESIN COMPOSITION AND RESIN MOLDING

(71) Applicant: FUJI XEROX CO., LTD., Tokyo (JP)

(72) Inventor: Kenji Yao, Minamiashigara (JP)

(73) Assignee: FUJI XEROX CO., LTD., Tokyo (JP)

( * ) Notice: Subject to any disclaimer, the term of this patent is extended or adjusted under 35 U.S.C. 154(b) by 14 days.

(21) Appl. No.: 15/641,564

(22) Filed: Jul. 5, 2017

(65) Prior Publication Data

US 2018/0230295 A1 Aug. 16, 2018

(30) Foreign Application Priority Data

Feb. 13, 2017 (JP) ................................. 2017-024389
Feb. 13, 2017 (JP) ................................. 2017-024390

(51) Int. Cl.
*C08L 1/12* (2006.01)

(52) U.S. Cl.
CPC ............. *C08L 1/12* (2013.01); *C08L 2201/08* (2013.01)

(58) Field of Classification Search
CPC ................................ C08L 1/12; C08L 2201/08
See application file for complete search history.

(56) References Cited

U.S. PATENT DOCUMENTS

2016/0090473 A1* 3/2016 Yao ........................... C08L 1/10
524/40
2017/0081505 A1 3/2017 Yao et al.

FOREIGN PATENT DOCUMENTS

| EP | 2500378 A1 | 9/2012 |
| JP | 2016-069423 A | 5/2016 |
| WO | 2011-078278 A1 | 6/2011 |

OTHER PUBLICATIONS

Jan. 5, 2018 European Search Report issued in Patent Application No. 17182548.2.

* cited by examiner

*Primary Examiner* — Robert D. Harlan
(74) *Attorney, Agent, or Firm* — Oliff PLC

(57) ABSTRACT

A resin composition includes: a cellulose acetate having a weight-average molecular weight of 30,000 to 90,000 and a substitution degree of 2.1 to 2.6; and a polyhydroxyalkanoate.

20 Claims, No Drawings

RESIN COMPOSITION AND RESIN MOLDING

CROSS-REFERENCE TO RELATED APPLICATIONS

This application is based on and claims priorities under 35 USC 119 from Japanese Patent Application No. 2017-024389 filed on Feb. 13, 2017 and Japanese Patent Application No. 2017-024390 filed on Feb. 13, 2017.

BACKGROUND

Technical Field

The present invention relates to a resin composition and a resin molding.

Related Art

Up to now a wide variety of resin compositions have been provided and put to diverse uses. Resin compositions have been used e.g. for various kinds of parts and cabinets of household electric appliances and automobiles in particular. Thermoplastic resins have also used for parts such as cabinets of office instruments and electrical-electronic instruments.

Recent years have seen utilization of plant-derived resins, and cellulose derivatives have been known previously as a kind of plant-derived resins.

Summary

According to an aspect of the invention, a resin composition includes: a cellulose acetate having a weight-average molecular weight of 30,000 to 90,000 and a substitution degree of 2.1 to 2.6; and a polyhydroxyalkanoate.

DETAILED DESCRIPTION

Embodiments as examples of the present resin compositions and resin moldings are illustrated below.

<Resin Composition>

Each of resin compositions according to the embodiments of the invention contains a cellulose acetate and a polyhydroxyalkanoate. And the cellulose acetate ranges from 30,000 to 90,000 in weight-average molecular weight and from 2.1 to 2.6 in substitution degree.

Conventional cellulose shows a high bending elasticity modulus by virtue of its strong intramolecular and intermolecular hydrogen bonding forces, and it has therefore the potential for application, e.g. as a metal substitute, to areas into which traditional resin materials are difficult to adopt.

However, because cellulose has a rigid chemical structure, the cellulose in an unmodified state has almost no thermoplasticity and almost no solubility in organic solvents, and therefore it has hardly been used for application to molding, such as injection molding or cast molding.

Under the circumstances, there has been known the art of converting cellulose into a cellulose acylate (an acylated cellulose derivative) by substituting acyl groups for at least part of hydroxyl groups the cellulose has, and then adding a plasticizer thereto for the purpose of creating moldability.

However, when a plasticizer was added in an amount enough to impart plasticity to such an extent as to bring about a state in which molding is allowed, cases occurred in which the resin moldings thus obtained were reduced in bending elasticity modulus.

On the other hand, when the plasticizer content was reduced to such an extent that heat resistance (e.g. a heat distortion temperature of 70° C. or higher (at 1.8 MPa)) and a bending elasticity modulus (e.g. 3,000 MPa or higher) of the resulting molding can be differentiated from those of traditional resin materials, shortage of plasticity was apt to occur. Because injection molding in particular is carried out at a high temperature, cases occurred in which the resulting moldings were stained.

In JP-A-2016-069423, there has been disclosed the art of mixing a cellulose ester with an adipic ester and polyhydroxyalkanoate, thereby lowering the molding temperature while controlling reduction in bending elasticity modulus and preventing the resulting molding from being stained.

However, it has come to be found that there occurred cases where the resin moldings obtained by molding the resin composition disclosed in JP-A-2016-069423 were low in impact resisting strength and heat resistance. In addition, depending on the shape of a resin molding (which is e.g. small in thickness and large in area), there were cases where lowering of moldability occurred. More specifically, it has come to be found that there were cases where the resin composition disclosed in JP-A-2016-069423 was high in melt viscosity and had flowability insufficient to be molded into a predetermined shape.

In contrast, the resin compositions relating to embodiments of the invention have the constitutions mentioned above, thereby having improved flowability while allowing controlled reduction in bending elasticity moduli of moldings produced therefrom and providing resin moldings enhanced in impact resisting strength. Although reasons therefor are uncertain, guesses may be made as follows.

When the weight-average molecular weight of a cellulose acetate is higher than 90,000, because the cellulose acetate with rigidity comes to have a great length and strong intermolecular force, it becomes difficult for a polyhydroxyalkanoate to enter into spaces among molecules of the cellulose acetate. Thus, it can be assumed that the cellulose acetate and the polyhydroxyalkanoate are present in their respective coagulation states in a resin composition and thereby the resin composition comes to have a heterogeneous structure. On the other hand, when the weight-average molecular weight of a cellulose acetate is lower than 30,000, the mechanical strength of the cellulose acetate in itself is apt to become low.

In contrast, the cellulose acetate in each of the resin compositions relating to the invention has a weight-average molecular weight of 90,000 or lower, and thereby the molecular length of the cellulose acetate with rigidity becomes small. In addition, intermolecular force of the cellulose acetate is weakened. It can thus be assumed that the polyhydroxyalkanoate becomes more likely to enter into spaces among molecules of the cellulose acetate. Therefore it can be presumed that it becomes difficult for the polyhydroxyalkanoate and the cellulose acetate to form a non-uniform continuous phase in each resin composition, and these constituents tend to form a structure close to a uniform state. As a consequence, not only flowability of each resin composition is increased, but also the polyhydroxyalkanoate tends to coordinate in a rigid state, and hence each resin composition can be considered to have increased heat resistance.

In addition, when the substitution degree in a cellulose acetate is in a range of 2.1 to 2.6, it is assumed that the cellulose acetate has an enhanced affinity for polyhydroxyalkanoate, and thereby polyhydroxyalkanoate becomes more likely to enter into spaces among molecules of the cellulose acetate.

As a consequence, it can be presumed that resin moldings obtained by molding the resin compositions relating to embodiments of the invention are increased in impact resistance while controlling reduction in bending elasticity modulus.

Further, when the cellulose acylate in each resin composition includes cellulose propionate and cellulose butyrate, the intermolecular force thereof becomes weak, and thereby the resin composition is reduced in melt viscosity, and it is improved in flowability. On the other hand, when these cellulose acylates are used, the resin moldings obtained are reduced in heat resistance.

Furthermore, each of the resin compositions relating to embodiments of the invention preferably contains at least one copolymer having olefin structural units and alkyl (meth)acrylate structural units, with the copolymer being selected from the group consisting of olefin-alkyl (meth)acrylate copolymers and olefin-(meth)acrylate-(unsaturated-1,2-dicarboxylic anhydride) copolymers (which hereafter may be simply referred to as "copolymers having olefin structural units and alkyl (meth)acrylate structural units").

When the copolymer having olefin structural units and alkyl (meth)acrylate structural units is an olefin-alkyl (meth)acrylate copolymer, the affinity between the acetyl groups of the cellulose acetate and the alkyl ester groups in the copolymer becomes more likely to enhance by adjusting the weight-average molecular weight of the cellulose acetate to the range of 30,000 to 90,000. Thus it is assumed that the copolymer acts as side chains of the cellulose acetate through the interactions between the acetyl groups of the cellulose acetate and the alkyl ester groups in the copolymer. Therefore the flowability of the resin composition is presumed to increase.

On the other hand, when the copolymer having olefin structural units and alkyl (meth)acrylate structural units includes an olefin-alkyl (meth)acrylate copolymer and an olefin-(meth)acrylate-(unsaturated-1,2-dicarboxylic anhydride) copolymer, it is assumed that the copolymer acts as side chains of the cellulose acetate through the reactions of hydroxyl and ester groups of the cellulose acetate with maleic anhydride structural units in the copolymer. Thus it can be presumed that hydrogen bonding force of the cellulose acetate is relaxed, thereby increasing flowability of the resin composition, and besides the heat resistance is increased through partial occurrence of coordination and bonding among side chains.

Furthermore, it is assumed that packing of intermolecular side chains can be kept low by adjusting the substitution degree in the cellulose acetate to the range of 2.1 to 2.6. In addition, such adjustment can be assumed to allow polyhydroxyalkanoate to enter easily into spaces among molecules of the cellulose acetate. And interactions become more likely to take place by virtue of affinity of the cellulose acetate for olefin-alkyl (meth)acrylate copolymers, or covalent bonds become more likely to form between the cellulose acetate and an olefin-(meth)acrylate-(unsaturated-1,2-dicarboxylic anhydride) copolymer. In consequence, it is presumed that the flowability of the resulting resin composition is enhanced and the heat resistance is increased through partial coordination and bonding among side chains.

From the foregoing, it is presumed that the resin compositions relating to embodiments of the inventions can attain improvement in flowability while controlling reduction in heat resistance by having the constituents as mentioned above.

In addition, because the resin compositions relating to embodiments of the invention have improvement in flowability, even when the shape of intended resin moldings is e.g. thin in profile and large in size, it becomes easy to obtain flowability required to form resin moldings of such a shape. And even when resin moldings of such a shape are formed, lowering of moldability becomes difficult to cause.

Constituents of the resin compositions relating to embodiments of the invention are illustrated below in detail. <Cellulose Acetate>

Each of the resin compositions relating to embodiments of the invention contains a cellulose acetate having a weight-average molecular weight in a range of 30,000 to 90,000 and a substitution degree in a range of 2.1 to 2.6.

Herein, the cellulose acetate is a cellulose derivative prepared by substituting acetyl groups for at least part of its hydroxyl groups, and more specifically, it is a cellulose derivative represented by the following formula (1).

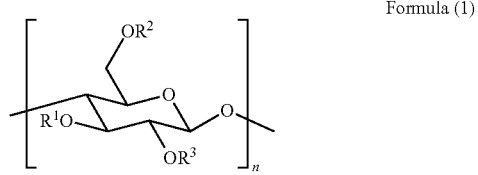

Formula (1)

In formula (1), each of $R^1$, $R^2$ and $R^3$ independently represents a hydrogen atom or an acetyl group. n represents an integer of 2 or above. Therein, at least some of $nR^1$s, $nR^2$s and $nR^3$s represent acetyl groups.

The range of n in formula (1) has no particular limits. It may be determined in accordance with the intended range of weight-average molecular weight. For example, n may be from 120 to 330.

—Weight-Average Molecular Weight—

In point of further increasing impact resisting strength of resin moldings while controlling reductions in their heat resistance and bending elasticity moduli, the weight-average molecular weight of the cellulose acetate is preferably from 40,000 to 90,000, far preferably from 60,000 to 90,000, further preferably from 60,000 to 80,000.

The weight-average molecular weight (Mw) is measured with a gel permeation chromatography system using a dimethylacetamide/lithium chloride=90/10 solution (GPC system: HLC-8320GPC made by Tosoh Corporation, column: TSKgel α-M), and is calculated in terms of polystyrene.

—Substitution Degree—

In point of further increasing impact resisting strength of resin moldings while controlling reductions in their heat resistance and bending elasticity moduli, the substitution degree in the cellulose acetate is preferably from 2.15 to 2.6, far preferably from 2.2 to 2.5, further preferably from 2.2 to 2.45.

Herein, the term substitution degree is an indicator of a degree to which acetyl groups are substituted for the hydroxyl groups the cellulose has. In other words, the substitution degree becomes an indicator pointing to the degree of acetylation in the cellulose acetate. More specifically, the substitution degree refers to the intramolecular average number of acetyl groups substituted for 3 hydroxyl groups present in each D-glucopyranose unit in cellulose acetate.

The substitution degree is determined from the ratio between the integrals of peaks originated from hydrogens of cellulose and acetyl groups in $H^1$-NMR (JMN-ECA, made by JEOL RESONANCE Inc.). By the way, the molecular weight of a constituent unit in a cellulose acetate is e.g. 263 when the degree of acetyl substitution is 2.4, while it is e.g. 284 when the degree of acetyl substitution is 2.9.

A suitable range of polymerization degree of the cellulose acetate may be e.g. from 120 to 330, from 200 to 300, or from 250 to 300. When the polymerization degree of the cellulose acetate is in the range as specified above, it becomes easy to obtain resin compositions which allow the forming of resin moldings increased in impact resisting strength with controlled reductions in heat resistance and bending elasticity modulus.

By the way, the polymerization degree of a cellulose acetate is determined from the weight-average molecular weight through the following procedure.

To begin with, the weight-average molecular weight of a cellulose acetate is determined in accordance with the above method.

Then, the weight-average molecular weight thus determined is divided by the molecular weight of a constituent unit of the cellulose acetate to determine the polymerization degree of the cellulose acetate.

Examples of a cellulose acetate include monoacetyl cellulose, diacetyl cellulose and triacetyl cellulose. These celluloses may be used alone or as a combination of two or more thereof.

Cellulose acetate has no particular restrictions as to manufacturing methods thereof, and it is manufactured suitably through the use of e.g. a method of giving acetylation to cellulose and decomposing the thus acetylated cellulose into low molecular ones (depolymerizing), and when required, carrying out deacetylation. On the other hand, commercially available cellulose acetate may be e.g. decomposed into low molecular ones (depolymerized) so as to attain the predetermined weight-average molecular weight.

<Polyhydroxyalkanoate>

Each of the resin compositions relating to embodiment of the invention contains a polyhydroxyalkanoate. Examples of the polyhydroxyalkanoate include resins of chemical structure represented by the following formula (2).

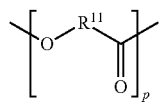

Formula (2)

(In formula (2), $R^{11}$ represents an alkylene group whose carbon number is from 1 to 10, and p represents an integer of 2 or above.)

The alkylene group represented by $R^{11}$ in formula (2) is preferably an alkylene group whose carbon number is from 3 to 6. The alkylene group represented by $R^{11}$ may have either a straight-chain form or a branched-chain form, but the branched-chain form is preferable from the viewpoint of allowing further improvements in flowability of the resin compositions and impact resisting strength of resin moldings formed from the resin compositions while controlling reductions in heat resistance and bending elasticity moduli of the resin moldings.

Herein, the expression of "$R^{11}$ in formula (2) represents an alkylene group" indicates that 1) $R^{11}$ represents the same alkylene group in the structural formula [—O—$R^{11}$—C(=O)—] and 2) $R^{11}$ represents different alkylene groups (alkylene groups differing in carbon number or branched form)in more than one structural formula [—O—$R^{11}$—C(=O)—], or a structural formula [—O—$R^{11A}$—C(=O)—] [—O—$R^{11B}$—C(=O)—].

In other words, the polyhydroxyalkanoate may be a homopolymer of one kind of hydroxyalkanoate (hydroxyalkanoic acid) or a copolymer of two or more kinds of hydroxyalkanoates (hydroxyalkanoic acids).

In formula (2), p has no particular upper limit, but the upper limit of p may be e.g. 20,000 or below. From the viewpoint of increasing impact resisting strength of resulting resin moldings while controlling reductions in heat resistance and bending elasticity moduli of the resin moldings, p is preferably from 500 to 10,000, far preferably from 1,000 to 8,000.

Examples of a hydroxyalkanoic acid for forming polyhydroxyalkanoate include lactic acid, 2-hydroxybutyric acid, 3-hydroxybutyric acid, 4-hydroxybutyric acid, 2-hydroxy-3-methylbutyric acid, 2-hydroxy-3,3-dimethylbutyric acid, 3-hydroxyvaleric acid, 4-hydroxyvaleic acid, 5-hydroxyvaleic acid, 3-hydroxyhexanoic acid, 2-hydroxycaproic acid, 2-hydroxyisocaproic acid, 6-hydroxycaproic acid, 3-hydroxypropionic acid, 3-hydroxy-2,2-dimethylpropionic acid, 3-hydroxyhexanoic acid and 2-hydroxy-n-octanoic acid.

Of these polyhydroxyalkanoates, copolymers produced from branched-chain hydroxyalkanoic acids whose carbon numbers are from 2 to 4 and branched-chain hydroxyalkanoic acids whose carbon numbers are from 5 to 7 (where the carboxyl carbon is counted as a member of the carbon number) are preferable from the viewpoint of increasing the flowability of resulting resin compositions and the impact resisting strength of resulting resin moldings while allowing control of reductions in heat resistance and bending elasticity moduli of the resulting resin moldings. In particular, a copolymer of 3-hydroxybutyric acid and 3-hydroxycaproic acid (a copolymer of 3-hydroxyburyrate and 3-hydroxyhexanoate) is far preferred.

When the polyhydroxyalkanoate is a copolymer of 3-hydroxybutyrate and 3-hydroxyhexanoate, the composition ratio of the 3-hydroxyhexanoate to the copolymer of the 3-hydroxybutyrate and 3-hydroxyhexanoate is preferably from 3 mole % to 20 mole %, far preferably from 4 mole % to 15 mole %, further preferably from 5 mole % to 12 mole %. By adjusting the composition ratio of the 3-hydroxyhexanoate in the copolymer to fall in a range of 3 mole % to 20 mole %, flowability of resulting compositions and impact resisting strength of resulting resin moldings are increased as reductions in heat resistance and bending elasticity moduli of resulting resin moldings are controlled.

By the way, the composition ratio of the 3-hydroxyhexanoate to a copolymer of the 3-hydroxybutyrate and 3-hydroxyhexanoate is determined by the following measurement method.

The composition ratio is determined by measuring the $H^1$-NMR spectrum of the copolymer, calculating the integral of a peak of the terminal H of butyrate and a peak of the terminal H of hexanoate, and then calculating a ratio of hexanoate to the total of butyrate and hexanoate.

It is appropriate that the weight-average molecular weight (Mw) of a polyhydroxyalkanoate be from 10,000 to 1,000,000 (preferably from 50,000 to 800,000, far preferably from 100,000 to 600,000).

By adjusting the weight-average molecular weight (Mw) of a polyhydroxyalkanoate to fall in the foregoing range, flowability of resulting resin compositions and impact resisting strength of resulting resin moldings are increased as reductions in heat resistance and bending elasticity moduli of the resulting resin moldings are controlled.

The weight-average molecular weight (Mw) of a polyhydroxyalkanoate is a value measured by gel permeation chromatography (GPC). To be more specific, molecular-weight measurement by GPC is carried out using HPLC1100, made by Tosoh Corporation, as a measurement device, a column made by Tosoh Corporation, TSKgel GMHHR-M+TsKgel GMHHR-M (7.8 mm I.D.30 cm), and chloroform as a solvent. From this measurement result, the weight-average molecular weight is determined using the molecular-weight calibration curve prepared from monodisperse polystyrene standard samples.

Examples of a polyhydroxyalkanoate are shown in Table 1 below, but they should not be construed as being limited to the products listed in the table.

TABLE 1

| Compound Name | Product Name | Maker |
|---|---|---|
| PHA-1 | Poly(3-hydroybutyrate-co-3-hydroxyhexanoate) [Copolymer of 3-hydroxybutyric acid and 3-hydroxycaproic acid] | AONILEX | Kaneka Corporation |
| PHA-2 | Polylactic acid | TERRAMAC TE2000 | Unitika Ltd. |
| PHA-3 | Poly(3-hydroxybutyrate-co-3-hydroxyvalerate) [Copolymer of 3-hydroxybutyric acid and 3-hydroxyvaleric acid] | BIOPOL | Zeneca |
| PHA-4 | Poly(3-hydroxybutyrate) [Homopolymer of 3-hydroxybutyrate] | BIOPOL | Zeneca |

<Cellulose Acetate Content and Polyhydroxyalkanoate Content>

In point of easy forming of resin moldings which are improved in impact resisting strength while having controlled reduction in their bending elasticity moduli, it is appropriate that the cellulose acetate content be from 70% by mass to 99.8% by mass, preferably from 75% by mass to 99.6% by mass, far preferably from 80% by mass to 99.5% by mass, further preferably from 85% by mass to 99.5% by mass, furthermore preferably from 90% by mass to 99.5% by mass, with respect to the whole quantity of a resin composition.

In the same point as mentioned above, it is appropriate that the polyhydroxyalkanoate content be from 0.2% by mass to 15% by mass, preferably from 0.4% by mass to 15% by mass, far preferably from 0.5% by mass to 15% by mass, further preferably 0.5% by mass to 10% by mass, with respect to the whole quantity of a resin composition.

When (A) represents the cellulose acetate content by mass of a resin composition and (B) represents the polyhydroxyalkanoate content by mass of the resin composition, it is appropriate that a mass ratio (B)/(A) be from 0.005 to 0.1. By adjusting the ratio (B)/(A) to fall in the above range, it becomes easy to obtain resin moldings which are improved in impact resisting strength while having controlled reduction in bending elasticity modulus. The ratio (B)/(A) is preferably from 0.01 to 0.08, far preferably from 0.02 to 0.07.

In addition, it is appropriate that the total of a cellulose acetate content and a polyhydroxyalkanoate content constitute at least 85% by mass, preferably at least 90% by mass, far preferably at least 95% by mass, optionally 100% by mass, of the whole quantity of a resin composition.

<Copolymer Having Olefin Structural Units and Alkyl (Meth)acrylate Structural Units>

A copolymer having olefin structural units and alkyl (meth)acrylate structural units is at least one copolymer selected from the group consisting of olefin-alkyl (meth)acrylate copolymers and olefin-(meth)acrylate-(unsaturated-1,2-dicarboxylic anhydride) copolymers.

As the copolymer having olefin structural units and alkyl (meth)acrylate structural units, either an olefin-alkyl (meth)acrylate copolymer or an olefin-(meth)acrylate-(unsaturated-1,2-dicarboxylic anhydride) copolymer, or a combination of these copolymers may be used.

By the way, the term "(meth)acrylate" used in the present description is intended to include both acrylate and methacrylate.

—Olefin-Alkyl (Meth)acrylate Copolymer—

Examples of an olefin-alkyl (meth)acrylate copolymer include copolymers having olefin structural units and structural units represented by the following formula (a-1).

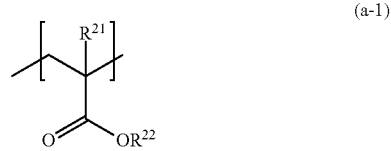

(a-1)

In the above formula, $R^{21}$ represents a hydrogen atom or a methyl group, and $R^{22}$ represents an alkyl group having a carbon number of 1 to 10.

The structural unit represented by formula (a-1) is preferably a structural unit of (meth)acrylate origin.

$R^{21}$ in formula (a-1) is preferably a hydrogen atom.

$R^{22}$ in formula (a-1) is preferably an alkyl group having a carbon number of 1 to 6, far preferably an alkyl group having a carbon number of 1 t 4, further preferably a methyl group or an ethyl group, especially preferably a methyl group, from the viewpoint of increasing flowability while controlling reduction in heat resistance of resulting resin moldings.

Additionally, the alkyl group in $R^{22}$ may be either a straight-chain alkyl group or a branched-chain alkyl group.

Olefin-alkyl (meth)acrylate copolymers each may have only one kind or more than one kind of structural units represented by formula (a-1).

From the viewpoint of increasing flowability while controlling reduction in heat resistance of resulting resin moldings, it is appropriate that the proportion of structural units represented by formula (a-1) in each olefin-alkyl (meth)acrylate copolymer be from 15% by mass to 35% by mass (preferably from 18% by mass to 35% by mass, far preferably from 20% by mass to 32% by mass) of the whole quantity of the copolymer.

Each of the above copolymers has structural units of olefin origin.

Olefins copolymerized in the above copolymers are preferably aliphatic hydrocarbon compounds having ethylenic unsaturated groups, and each of them is preferably at least one compound selected from the group consisting of ethylene and α-olefins, far preferably at least one compound selected from the group consisting of ethylene and propylene, especially preferably ethylene.

In addition, each of the olefin-alkyl (meth)acrylate copolymers preferably has structural units represented e.g. by the following formula (b-1) as structural units of olefin origin.

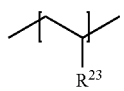
(b-1)

In the above formula, $R^{23}$ represents a hydrogen atom or an alkyl group having a carbon number of 1 to 8.

From the viewpoint of increasing the flowability while controlling reduction in heat resistance of resulting resin moldings, $R^{23}$ in formula (b-1) is preferably a hydrogen atom or an alkyl group having a carbon number of 1 to 6, far preferably a hydrogen atom or a methyl group, especially preferably a hydrogen atom.

In addition, the alkyl group as $R^{23}$ may be either a straight-chain alkyl group or a branched-chain alkyl group, but it is preferably a straight-chain alkyl group.

Olefin-alkyl (meth)acrylate copolymers each may have only one kind or more than one kind of structural units represented by formula (b-1).

From the viewpoint of increasing flowability while controlling reduction in heat resistance of resulting resin moldings, it is appropriate that the proportion of structural units represented by formula (b-1) in each olefin-alkyl (meth)acrylate copolymer be from 55% by mass to 85% by mass (preferably from 65% by mass to 85% by mass, far preferably from 68% by mass to 80% by mass) of the whole quantity of the olefin-alkyl (meth)acrylate copolymer.

Each of the olefin-alkyl(meth)acrylate copolymers may contain structural units other than the structural units represented by formula (a-1) or formula (b-1), but preferably contains no other structural units. In other words, the copolymer is preferably a binary copolymer having structural units represented by formula (a-1) and those represented by formula (b-1).

When an olefin-alkyl (meth)acrylate copolymer has other structural units, monomers forming the other structural units have no particular restrictions, and examples thereof include known ethylenic unsaturated compounds other than the above-recited ones.

Examples of a monomer forming the other structural units include styrene compounds, vinyl ether compounds, vinyl ester compounds and (meth)acrylate compounds other than the above-recited ones. Only one or more than one among these monomers may form the other structural units.

When an olefin-alkyl (meth)acrylate copolymer has other structural units, it is appropriate that the proportion of the other structural units be at most 10% by mass (preferably at most 5% by mass, far preferably at most 1% by mass) of the whole quantity of the olefin-alkyl (meth)acrylate copolymer.

The olefin-alkyl (meth)acrylate copolymers have no particular restrictions as to their end structure, and depending on the reaction conditions and the kind of a reaction terminator used, there are cases where various groups are formed as end structure and examples thereof include a hydrogen atom, a hydroxyl group, an ethylenic unsaturated group, an alkoxy group and an alkylthio group.

The weight-average molecular weight Mw of each copolymer is preferably from 5,000 to 200,000, far preferably from 10,000 to 100,000, from the viewpoint of increasing the flowability while controlling reduction in heat resistance of resulting resin moldings.

The olefin-alkyl (meth)acrylate copolymers may be used alone or as a combination of two or more thereof.

Of the olefin-alkyl (meth)acrylate copolymers, ethylene-alkyl (meth)acrylate copolymers are preferred over the others from the viewpoint of increasing the flowability while controlling reduction in heat resistance of resulting resin moldings. Examples of an ethylene-alkyl (meth)acrylate copolymer include an ethylene-methyl methacrylate copolymer, an ethylene-ethyl (meth)acrylate copolymer, an ethylene-propyl (meth)acrylate copolymer and an ethylene-butyl (meth)acrylate copolymer.

—Olefin-(Meth)acrylate-(Unsaturated-1,2-Dicarboxylic Anhydride Copolymer—

Examples of an olefin-(meth)acrylate-(unsaturated-1,2-dicarboxylic anhydride) polymer include copolymers each having olefin structural units, structural units represented by the following formula (a-2) and structural units represented by the following formula (b-2).

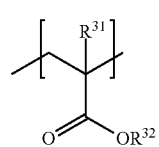
(a-2)

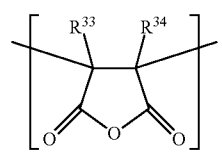
(b-2)

In the above formulae, $R^{31}$ represents a hydrogen atom or a methyl group, $R^{32}$ represents an alkyl group having a carbon number of 1 to 10, and each of $R^{33}$ and $R^{34}$ independently represents a hydrogen atom or an alkyl group having a carbon number of 1 to 10.

Examples of the structural unit represented by formula (a-2) include the same ones as included in examples of the structural unit represented by formula (a-1) in the above description of olefin-alkyl (meth)acrylate copolymers.

Olefin-(meth)acrylate-(unsaturated-1,2-dicarboxylic anhydride) copolymers each may have only one kind or more than one kind of the structural units represented by formula (a-2).

From the viewpoint of increasing the flowability while controlling reduction in heat resistance of resulting resin moldings, it is appropriate that the proportion of the structural units represented by formula (a-2) in each olefin-(meth)acrylate-(unsaturated-1,2-dicarboxylic anhydride) copolymer be from 1% by mass to 40% by mass (preferably from 2% by mass to 35% by mass, far preferably from 5% by mass to 30% by mass) of the whole quantity of the olefin-(meth)acrylate-(unsaturated-1,2-dicarboxylic anhydride) copolymer.

The structural units represented by formula (b-2) are preferably structural units derived from an unsaturated-1,2-dicarboxylic anhydride.

From the viewpoint of increasing the flowability while controlling reduction in heat resistance of resulting resin moldings, at least either of $R^{33}$ and $R^{34}$ in formula (b-2) is preferably a hydrogen atom, and it is especially preferred that both of $R^{33}$ and $R^{34}$ be hydrogen atoms.

From the viewpoint of increasing the flowability while controlling reduction in heat resistance of resulting resin moldings, the alkyl groups represented by $R^{33}$ and $R^{34}$ in formula (b-2) are preferably alkyl groups each having a carbon number of 1 to 6, far preferably alkyl groups each having a carbon number of 1 to 4, further preferably methyl groups or ethyl groups, especially preferably methyl groups.

In addition, the alkyl groups represented by $R^{33}$ and $R^{34}$ may be either straight-chain alkyl groups or branched-chain alkyl groups. Further, $R^{33}$ and $R^{34}$ may combine with each other to form a ring structure. Such a ring structure is preferably a 5-membered or 6-membered ring structure.

Olefin-(meth)acrylate-(unsaturated-1,2-dicarboxylic anhydride) copolymers each may have only one kind or more than one kind of structural units represented by formula (b-2).

From the viewpoint of increasing flowability while controlling reduction in heat resistance of resulting resin moldings, it is appropriate that the proportion of structural units represented by formula (b-2) in each olefin-(meth)acrylate-(unsaturated-1,2-dicarboxylic anhydride) copolymer be from 0.1% by mass to 10% by mass (preferably 0.3% by mass to 6.5% by mass, far preferably 1.0% by mass to 5.0% by mass) of the whole quantity of the olefin-(meth)acrylate-(unsaturated-1,2-dicarboxylic anhydride) copolymer.

It is appropriate that the ratio of a proportion by mass (Ma) of structural units represented by formula (a-2) to a proportion by mass (Mb) of structural units represented by formula (b-2) in each olefin-(meth)acrylate-(unsaturated-1,2-dicarboxylic anhydride) copolymer, Ma/Mb, be from 1 to 100 (preferably from 1 to 50, far preferably from 1 to 30, further preferably from 5 to 10). By adjusting the ratio between proportions to fall in the above range, it becomes easy to improve the flowability while allowing control of reduction in heat resistance of resulting resin moldings.

Olefin-(meth)acrylate-(unsaturated-1,2-dicarboxylic anhydride) copolymers each have olefin structural units.

The olefin introduced as a copolymerized unit into the above copolymers is preferably an aliphatic hydrocarbon compound having an ethylenic unsaturated group, far preferably at least one kind of compound selected from the group consisting of ethylene and α-olefins, further preferably at least one kind of compound selected from the group consisting of ethylene and propylene, especially preferably ethylene.

In addition, the structural unit of olefin origin is preferably a unit having a structure represented e.g. by the following formula (c-2).

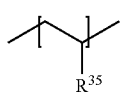

(c-2)

In the above formula, $R^{35}$ represent a hydrogen atom or an alkyl group having a carbon number of 1 to 8.

Examples of the olefin structural unit include the same ones as included in examples of the structural unit represented by formula (b-1) in the above description of olefin-alkyl (meth)acrylate copolymers.

Olefin-(meth)acrylate-(unsaturated-1,2-dicarboxylic anhydride) copolymers each may have only one kind or more than one kind of the structural units represented by formula (c-2).

From the viewpoints of flowability of a resin composition and heat resistance of resin moldings obtained from the resin composition, the proportion of structural units represented by formula (c-2) in each olefin-(meth)acrylate-(unsaturated-1,2-dicarboxylic anhydride) copolymer is preferably from 50% by mass to 98.9% by mass, far preferably from 60% by mass to 95% by mass, especially preferably from 65% by mass to 92% by mass, with respect to the whole quantity of the olefin-(meth)acrylate-(unsaturated-1,2-dicarboxylic anhydride) copolymer.

Olefin-(meth)acrylate-(unsaturated-1,2-dicarboxylic anhydride) copolymers each may have structural units other than the structural units represented by formulae (a-2) through (c-2), but preferably have no other structural units.

Monomers to form the other structural units have no particular restrictions, and examples thereof include known ethylenic unsaturated compounds other than the above-recited ones.

Examples of monomers forming the other structural units include styrene compounds, vinyl ether compounds, vinyl ester compounds and (meth)acrylate compounds other than the above-recited ones.

Only one kind or more than one kind of the other structural units may be introduced into each of the olefin-(meth)acrylate-(unsaturated-1,2-dicarboxylic acid anhydride) copolymers.

The proportion of the other structural units in each of the above copolymers is preferably 10% by mass or below, far preferably 5% by mass or below, further preferably 1% by mass or below, with respect to the whole quantity of each of the above copolymers, and absence of the other structural units in each of the above copolymers is especially preferred.

Each of the olefin -(meth)acrylate-(unsaturated-1,2-dicarboxylic anhydride) copolymers is preferably a ternary copolymer of olefin-(meth)acrylate and unsaturated-1,2-dicarboxylic anhydride.

Further, the above copolymer is preferably a copolymer having structural units represented by formula (a-2), structural units represented by formula (b-2) and structural units represented by formula (c-2).

Each of the olefin-(meth)acrylate-(unsaturated-1,2-dicarboxylic acid anhydride) copolymers has no particular restrictions as to its end structure, and depending on reaction conditions and the kind of a reaction terminator used, there are cases where various groups are formed as the end structure, and examples thereof include a hydrogen atom, a hydroxyl group, an ethylenic unsaturated group, an alkoxy group and an alkylthio group.

The weight-average molecular weight Mw of each olefin-(meth)acrylate-(unsaturated-1,2-dicarboxylic anhydride) copolymer is preferably from 5,000 to 200,000, far preferably from 10,000 to 100,000, from the viewpoint of the flowability of a resulting resin composition and the heat resistance of resulting resin moldings.

Olefin-(meth)acrylate-(unsaturated-1,2-dicarboxylic anhydride) copolymers may be used alone or as a combination of two or more thereof.

Of all those olefin -(meth)acrylate-(unsaturated-1,2-dicarboxylic anhydride) copolymers, ethylene-alkyl (meth)acrylate-maleic anhydride copolymers are preferred over the others from the viewpoint of increasing the flowability while allowing control of reduction in heat resistance of resulting resin moldings. Examples of an ethylene-alkyl (meth)acrylate copolymer include an ethylene-methyl (meth)acrylate-maleic anhydride copolymer, an ethylene-ethyl (meth)acrylate-maleic anhydride copolymer, an ethylene-propyl (meth)acrylate-maleic anhydride copolymer and an ethylene-butyl (meth)acrylate-maleic anhydride copolymer.

<Constitution of Resin Composition>
(Mass Ratio between Cellulose Acetate and Polyhydroxyalkanoate>

In a resin composition, when (A) represents the cellulose acetate content by mass and (B) represents the polyhydroxyalkanoate content by mass, it is appropriate that a mass ratio (B)/(A) be from 0.005 to 0.1. By adjusting the ratio (B)/(A) to fall in the above range, it becomes easy to obtain a resin composition which is improved in flowability while allowing control of reduction in heat resistance of resulting resin moldings. The ratio (B)/(A) is preferably from 0.01 to 0.08, far preferably from 0.02 to 0.07.

(Mass Ratio between Cellulose Acetate and Copolymer Having Olefin Structural Units and Alkyl (Meth)acrylate Structural Units)

In a resin composition, when (A) represents the content by mass of a cellulose acetate and (C) represents the content by mass of a copolymer having olefin structural units and alkyl (meth)acrylate structural units, it is appropriate that a mass ratio (C)/(A) be from 0.005 to 0.1. By adjusting the ratio (C)/(A) to fall in the above range, it becomes easy to obtain a resin composition which is improved in flowability while allowing control of reduction in heat resistance of resulting resin moldings. The ratio (C)/(A) is preferably from 0.01 to 0.07, far preferably from 0.01 to 0.05.

In addition, it is appropriate that the total for the content of a cellulose acetate, the content of a polyhyroxyalkanoate and the content of a copolymer having olefin structural units and alkyl (meth)acrylate units be 85% by mass or above, preferably 90% by mass or above, far preferably 95% by mass or more, with respect to the whole quantity of a resulting resin composition, and the total content of these ingredients may be 100% by mass.

(Cellulose Acetate Content)

From the viewpoint of increasing the flowability while allowing control of reduction in heat resistance of resulting resin moldings, it is appropriate that the cellulose acetate content constitute from 55% by mass to 99.6% by mass, preferably from 65% by mass to 99.6% by mass, far preferably from 70% by mass to 99.6% by mass, further preferably from 75% by mass to 99.6% by mass, still further preferably from 80% by mass to 99% by mass, furthermore preferably from 85% by mass to 98% by mass, still furthermore preferably from 90% by mass to 96% by mass, of the whole quantity of a resulting resin composition.

(Polyhydroxyalkanoate Content)

From the same viewpoint as mentioned above, the polyhydroxyalkanoate content is preferably from 0.2 parts by mass to 15% by mass, far preferably from 0.5% by mass to 10% by mass, further preferably from 1% by mass to 5% by mass, furthermore preferably from 2% by mass to 5% by mass, with respect to the whole quantity of a resulting resin composition.

(Content of Copolymer Having Olefin Structural Units and Alkyl (Meth)Acrylate Structural Units)

From the same viewpoint as mentioned above, the total for contents (total content) of copolymers each having olefin structural units and alkyl (meth)acrylate structural units is preferably from 0.2% by mass to 15% by mass, far preferably from 0.5% by mass to 10% by mass, further preferably from 1% by mass to 5% by mass, furthermore preferably from 2% by mass to 5% by mass, with respect to the whole quantity of a resulting resin composition.

—Content of Olefin-Alkyl(Meth)Acrylate Copolymer—

When the copolymer having olefin structural units and alkyl (meth)acrylate structural units is an olefin-alkyl (meth)acrylate copolymer, it is appropriate that the content of the olefin-alkyl (meth)acrylate copolymer constitute from 0.1% by mass to 10% by mass (preferably from 1% by mass to 7% by mass, far preferably from 2% by mass to 5% by mass) of the whole quantity of a resulting resin composition.

—Content of Olefin-(Meth)Acrylate-(Unsaturated-1,2-Dicarboxylic Anhydride) Copolymer—

When the copolymer having olefin structural units and alkyl (meth)acrylate structural units is an olefin-(meth)acrylate-(unsaturated-1,2-dicarboxylic anhydride) copolymer, it is appropriate that the content of the olefin-(meth)acrylate-(unsaturated-1,2-dicarboxylic anhydride) copolymer constitute from 0.1% by mass to 10% by mass (preferably from 1% by mass to 7% by mass, far preferably from 2% by mass to 5% by mass) of the whole quantity of a resulting resin composition.

<Plasticizer>

Each of the resin Compositions relating to embodiment of the invention may further contain a plasticizer.

Examples of such a plasticizer include an adipic ester-containing compound, a polyether ester compound, a condensed phosphoric ester compound, a sebacic ester compound, a glycol ester compound, an acetic ester compound, a dibasic acid ester compound, a phosphoric ester compound, a phthalic ester compound, camphor, a citric ester compound, a stearic ester compound, metallic soap, a polyol compound and a polyalkylene oxide compound.

Of these compounds, an adipic ester-containing compound and a polyester ester compound are preferable to the others, and an adipic ester-containing compound in particular is preferred.

—Adipic Ester-Containing Compound—

The term adipic ester-containing compound (compound containing an adipic ester) is intended to include a compound containing only an adipic ester and a mixture of an adipic ester and an ingredient other than an adipic ester (a compound different from an adipic ester). However, it is appropriate that the adipic ester-containing compound contain an adipic ester in a proportion of at least 50% by mass to the total quantity of all ingredients thereof.

Examples of an adipic ester include an adipic diester and an adipic polyester. More specifically, the examples include adipic diesters represented by the following formula (AE-1) and adipic polyesters represented by the following formula (AE-2).

Formula (AE-1)

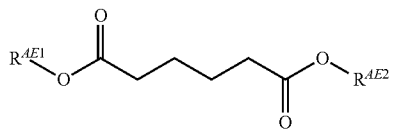

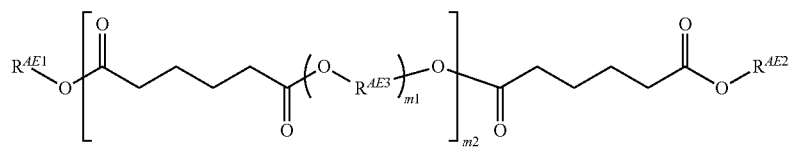

Formula (AE-2)

In formulae (AE-1) and (AE-2), each of $R^{AE1}$ and $R^{AE2}$ independently represents an alkyl group or a polyoxyalkyl group [—$(C_xH_{2x}$—$O)_y$—$R^{A1}$] (where $R^{A1}$ represents an alkyl group). x represents an integer of 1 to 6. y represents an integer of 1 to 6.

$R^{AE3}$ represents an alkylene group.

m1 represents an integer of 1 to 5.

m2 represents an integer of 1 to 10.

In formulae (AE-1) and (AE-2), the alkyl group represented by each of $R^{AE1}$ and $R^{AE2}$ is preferably an alkyl group having a carbon number of 1 to 6, far preferably an alkyl group having a carbon number of 1 to 4. The alkyl group represented by each of $R^{AE1}$ and $R^{AE2}$ may have any of straight-chain, branched-chain and cyclic shapes, but straight-chain and branched-chain shapes are preferred.

As to the polyoxyalkyl group [—$(C_xH_{2x}$—$O)_y$—$R^{A1}$] represented by each of $R^{AE1}$ and $R^{AE2}$ in formulae (AE-1) and (AE-2), the alkyl group represented by $R^{A1}$ is preferably an alkyl group having a carbon number of 1 to 6, far preferably an alkyl group having a carbon number of 1 to 4. The alkyl group represented by $R^{A1}$ may have any of straight-chain, branched-chain and cyclic shapes, but straight-chain and branched-chain shapes are preferred. x represents an integer of 1 to 6. y represents an integer of 1 to 6.

In formula (AE-2), the alkylene group represented by $R^{AE3}$ is preferably an alkylene group having a carbon number of 1 to 6, far preferably an alkylene group having a carbon number of 1 to 4. The alkylene group may have any of straight-chain, branched-chain and cyclic shapes, but straight-chain and branched-chain shapes are preferred.

In formulae (AE-1) and (AE-2), the group represented by each individual symbol may have a substituent. Examples of such a substituent include an alkyl group, an aryl group and a hydroxyl group.

The molecular weight (or weight-average molecular weight) of an adipic ester is preferably from 100 to 10,000, far preferably from 200 to 3,000. By the way, the weight-average molecular weight is a value determined by the same measurement method as used for determination of weight-average molecular weights of the polyether ester compounds.

Examples of an adipic ester-containing compound are shown in Table 2 below, but they should not be construed as being limited to the products listed in the table.

TABLE 2

| Substance Name | | Product Name | Maker |
|---|---|---|---|
| ADP1 | Adipic diester | DAIFATTY 101 | DAIHACHI CHEMICAL INDUSTRY CO., LTD. |
| ADP2 | Adipic diester | ADK CIZER RS-107 | ADEKA CORPORATION |
| ADP3 | Adipic polyester | POLYCIZER W-230-H | DIC CORPORATION |

—Polyether Ester Compound—

Examples of a polyether ester compound include polyether ester compounds represented e.g. by the following formula (EE).

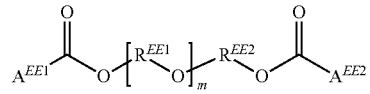

Formula (EE)

In formula (EE), each of $R^{EE1}$ and $R^{EE2}$ independently represents an alkylene group having a carbon number of 2 to 10. Each of $A^{EE1}$ and $A^{EE2}$ independently represents an alkyl group having a carbon number of 1 to 6, an aryl group having a carbon number of 6 to 12, or an aralkyl group having a carbon number of 7 to 18. m represents an integer of 1 or above.

In formula (EE), the alkylene group represented by $R^{EE1}$ is preferably an alkylene group having a carbon number of 3 to 10, far preferably an alkylene group having a carbon number of 3 to 6. The alkylene group represented by $R^{EE1}$ may have any of straight-chain, branched-chain and cyclic shapes, but a straight-chain shape is preferred.

When the alkylene group represented by $R^{EE1}$ has a carbon number of 3 or above, reduction in flowability of a resulting resin composition is controlled, and thereby thermoplasticity becomes easy to develop. When the alkylene group represented by $R^{EE1}$ has a carbon number not greater than 10 or it has a straight-chain shape, such a polyether ester compound is likely to have high affinity for cellulose acetates. Thus, when the alkylene group represented by $R^{EE1}$ has a straight-chain shape and its carbon number in the above range, a resulting resin composition increases in moldability.

From these viewpoints, n-hexylene group (—$(CH_2)_6$-) in particular is suitable as the alkylene group represented by $R^{EE1}$. In other words, a compound containing an n-hexylene group (—$(CH_2)_6$-) as $R^{EE1}$ is suitable as the polyether ester compound.

In formula (EE), the alkylene group represented by $R^{EE2}$ is preferably an alkylene group having a carbon number of 3 to 10, far preferably an alkylene group having a carbon number of 3 to 6. The alkylene group represented by $R^{EE2}$ may have any of straight-chain, branched-chain and cyclic shapes, but a straight-chain shape is preferred.

When the alkylene group represented by $R^{EE2}$ has a carbon number of 3 or above, reduction in flowability of a resulting resin composition is controlled, and thereby thermoplasticity becomes easy to develop. When the alkylene group represented by $R^{EE2}$ has a carbon number not greater than 10 or it has a straight-chain shape, such a polyether ester compound is likely to have high affinity for cellulose acetates. Thus, when the alkylene group represented by $R^{EE2}$ has a straight-chain shape and its carbon number in the above range, a resulting resin composition increases in moldability.

From these viewpoints, n-butylene group (—(CH$_2$)$_4$—) in particular is suitable as the alkylene group represented by R$^{EE2}$. In other words, the polyether ester compound is preferably a compound containing an n-butylene group (—(CH$_2$)$_4$-) represented as R$^{EE2}$.

In formula (EE), the alkyl group represented by each of A$^{EE1}$ and A$^{EE2}$ is an alkyl group having a carbon number of 1 to 6, preferably an alkyl group having a carbon number of 2 to 4. The alkyl group represented by each of A$^{EE1}$ and A$^{EE2}$ may be any of straight-chain, branched-chain and cyclic shapes, but a branched-chain shape is preferred.

The aryl group represented by each of A$^{EE1}$ and A$^{EE2}$ is an aryl group having a carbon number of 6 to 12, with examples including unsubstituted aryl groups, such as phenyl and naphthyl groups, and substituted phenyl groups, such as t-butylphenyl and hydroxyphenyl groups.

The aralkyl group represented by each of A$^{EE1}$ and A$^{EE2}$ is a group represented by —R$^4$-Ph. R$^4$ represents a straight-chain or branched-chain alkylene group having a carbon number of 1 to 6 (preferably a carbon number of 2 to 4). Ph is an unsubstituted phenyl group or a substituted phenyl group having as a substituent a straight-chain or branched-chain alkyl group having a carbon number of 1 to 6 (preferably a carbon number of 2 to 6). Examples of such an aralkyl group include unsubstituted aralkyl groups, such as benzyl, phenylmethyl (phenethyl), phenylpropyl and phenylbutyl groups, and substituted aralkyl groups, such as methylbenzyl, dimethylbenzyl and methylphenethyl groups.

At least one of A$^{EE1}$ and A$^{EE2}$ represents an aryl group or an aralkyl group. That is, the polyether ester compound is preferably a compound that at least one of A$^{EE1}$ and A$^{EE2}$ represents an aryl group (preferably a phenyl group) or an aralkyl groups, and also the polyester compound is preferably a compound that each of A$^{EE1}$ and A$^{EE2}$ represents an aryl group (preferably a phenyl group) or an aralkyl group.

Next, properties of a polyether ester compound are described.

The weight-average molecular weight (Mw) of a polyether ester compound is preferably from 450 to 650, far preferably from 500 to 600. When the polyether ester compound has a weight-average molecular weight (Mw) of 450 or above, bleed (precipitation phenomenon) becomes difficult to cause. When the polyether ester compound has a weight-average molecular weight (Mw) of 650 or below, affinity thereof for cellulose acetates is likely to enhance. Thus, when the weight-average molecular weight (Mw) is adjusted to within the above range, a resulting resin composition increases in moldability.

By the way, the weight-average molecular weight (Mw) of a polyether ester compound is a value measured by gel permeation chromatography (GPC). To be more specific, molecular weight measurement by GPC is carried out using HPLC1100, made by Tosoh Corporation, as a measurement device, a column made by Tosoh Corporation, TSK gel GMHHR-M+TsK gel GMHHR-M (7.8 mm I.D.30 cm), and chloroform as a solvent. From this measurement result, the weight-average molecular weight is determined using the molecular-weight calibration curve prepared from monodisperse polystyrene standard samples.

The viscosity of a polyether ester compound at 25° C. is preferably from 35 mPa·s to 50 mPa·s, far preferably from 40 mPa·s to 45 mPa·s.

When its viscosity is adjusted to 35 mPa·s or above, the polyether ester compound is likely to have increased dispersibility in cellulose acetate. When the polyether ester compound has viscosity adjusted to 50 mPa·s or below, anisotropy in its dispersibility becomes difficult to develop. Thus, when the viscosity is adjusted to within the above range, a resulting resin composition increases in moldability.

By the way, the viscosity is a value measured with an E-type viscometer.

The solubility parameter (SP value) of a polyether ester compound is preferably from 9.5 to 99, far preferably from 9.6 to 9.8.

When the solubility parameter is adjusted to within the range of 9.5 to 9.9, the dispersibility of a polyether ester compound in cellulose acetate becomes easy to enhance.

The solubility parameter (SP value) is a value estimated by the Fedors method. More specifically, the solubility parameter (SP value) conforms e.g. to the description in Polymer Engineering and Science, vol. 14, p.147 (1974), and it is determined by the expression of SP value=√(Ev/v) =√(ΣΔei/ΣΔvi) (wherein Ev is evaporation energy (cal/mol), v is molar volume (cm$^3$/mol), Δei is evaporation energy of each individual atom or atomic group and Δvi is molar volume of each individual atom or atomic group).

By the way, (cal/cm$^3$) is adopted as a unit of solubility parameter (SP value), but herein the unit is omitted according to established practice and dimensionless notation is used.

Examples of a polyether ester compound are shown in Table 3 below, but they should not be construed as being limited to the compounds listed in the table.

TABLE 3

| | R$^{EE1}$ | R$^{EE2}$ | A$^{EE1}$ | A$^{EE2}$ | Mw | Viscosity (25° C.) | APHA | SP Value |
|---|---|---|---|---|---|---|---|---|
| PEE1 | —(CH$_2$)$_6$— | —(CH$_2$)$_4$— | phenyl group | phenyl group | 550 | 43 | 120 | 9.7 |
| PEE2 | —(CH$_2$)$_2$— | —(CH$_2$)$_4$— | phenyl group | phenyl group | 570 | 44 | 115 | 9.4 |
| PEE3 | —(CH$_2$)$_{10}$— | —(CH$_2$)$_4$— | phenyl group | phenyl group | 520 | 48 | 110 | 10.0 |
| PEE4 | —(CH$_2$)$_6$— | —(CH$_2$)$_2$— | phenyl group | phenyl group | 550 | 43 | 115 | 9.3 |
| PEE5 | —(CH$_2$)$_6$— | —(CH$_2$)$_{10}$— | phenyl group | phenyl group | 540 | 45 | 115 | 10.1 |
| PEE6 | —(CH$_2$)$_6$— | —(CH$_2$)$_4$— | t-butyl group | t-butyl group | 520 | 44 | 130 | 9.7 |
| PEE7 | —(CH$_2$)$_6$— | —(CH$_2$)$_4$— | phenyl group | phenyl group | 460 | 45 | 125 | 9.7 |
| PEE8 | —(CH$_2$)$_6$— | —(CH$_2$)$_4$— | phenyl group | phenyl group | 630 | 40 | 120 | 9.7 |
| PEE9 | —(CH$_2$)$_6$— | —(CH$_2$)$_4$— | phenyl group | phenyl group | 420 | 43 | 135 | 9.7 |
| PEE10 | —(CH$_2$)$_6$— | —(CH$_2$)$_4$— | phenyl group | phenyl group | 670 | 48 | 105 | 9.7 |
| PEE11 | —(CH$_2$)$_6$— | —(CH$_2$)$_4$— | phenyl group | phenyl group | 550 | 35 | 130 | 9.7 |
| PEE12 | —(CH$_2$)$_6$— | —(CH$_2$)$_4$— | phenyl group | phenyl group | 550 | 49 | 125 | 9.7 |
| PEE13 | —(CH$_2$)$_6$— | —(CH$_2$)$_4$— | phenyl group | phenyl group | 550 | 32 | 120 | 9.7 |
| PEE14 | —(CH$_2$)$_6$— | —(CH$_2$)$_4$— | phenyl group | phenyl group | 550 | 53 | 105 | 9.7 |
| PEE15 | —(CH$_2$)$_6$— | —(CH$_2$)$_4$— | phenyl group | phenyl group | 550 | 43 | 135 | 9.7 |

TABLE 3-continued

| | $R^{EE1}$ | $R^{EE2}$ | $A^{EE1}$ | $A^{EE2}$ | Mw | Viscosity (25° C.) | APHA | SP Value |
|---|---|---|---|---|---|---|---|---|
| PEE16 | —(CH$_2$)$_6$— | —(CH$_2$)$_4$— | phenyl group | phenyl group | 550 | 43 | 105 | 9.7 |
| PEE17 | —(CH$_2$)$_6$— | —(CH$_2$)$_4$— | phenyl group | phenyl group | 550 | 43 | 150 | 9.7 |
| PEE18 | —(CH$_2$)$_6$— | —(CH$_2$)$_4$— | phenyl group | phenyl group | 550 | 43 | 95 | 9.7 |

When each of the resin compositions relating to embodiments of the invention contains a plasticizer, the proportion of a plasticizer content to the whole quantity of each resin composition has no particular limits. From the viewpoint of increasing flowability of each resin composition and impact resisting strength of resulting resin moldings while allowing control of reductions in heat resistance and bending elasticity moduli of the resulting moldings even when the resin composition contains a plasticizer, it is appropriate that the proportion of a plasticizer content to the whole quantity of each resin composition be 15% by mass or below (preferably 10% by mass or below, far preferably 5% by mass or below). In addition, when the plasticizer content is in the above range, it becomes easy to control plasticizer bleed.

<Other Ingredients>

Each of the resin compositions relating to embodiments of the invention may further contain, as the need arises, ingredients other than those mentioned above. Examples of other ingredients include a flame retardant, a compatibilizer, an antioxidant, a release agent, a lightfastness agent, a weatherproof agent, a coloring agent, pigments, a modifier, a drip inhibitor, an antistatic agent, a hydrolysis inhibitor, a filler and a reinforcing agent (e.g. glass fiber, carbon fiber, talc, clay, mica, glass flakes, milled glass, glass beads, crystalline silica, alumina, silicon nitride, aluminum nitride, boron nitride or so on).

In addition, ingredients (additives), such as an acid acceptor for prevention of acetic acid release and a reactive trapping agent, may be added as required. Examples of an acid acceptor include oxides such as magnesium oxide and aluminum oxide, metal hydroxides such as magnesium hydroxide, calcium hydroxide, aluminum hydroxide and hydrotalcite, calcium carbonate and talc.

Examples of a reactive trapping agent include an epoxy compound, an acid anhydride compound and a carbodiimide.

The content of these ingredients preferably constitutes 0 to 5% by mass of the whole quantity of each resin composition. Here "0% by mass" means that each resin component is free of the other ingredients.

Each of the resin compositions relating to embodiments of the invention may contain resins other than those mentioned above (cellulose acetates and polyhydroxyalkanoates). When each resin composition contains other resins, it is, however, appropriate that the content of the other resins constitute at most 5% by mass, preferably lower than 1% by mass, of the whole quantity of the resin composition. It is far preferred that each resin composition be free of the other resins (or equivalently, the content of the other resins be 0% by % by mass).

Examples of the other resins include previously known thermoplastic resins, such as polycarbonate resins, polypropylene resins, polyester resins, polyolefin resins, polyester carbonate resins, polyphenylene ether resins, polyphenylene sulfide resins, polysulfone resins, polyether sulfone resins, polyarylene resins, polyether imide resins, polyacetal resins, polyvinyl acetal resins, polyketone resins, polyether ketone resins, polyether ether ketone resins, polyaryl ketone resins, polyether nitrile resins, liquid crystal resins, polybenzimidazole resins, polyparabanic acid resins, vinyl-based homopolymers or copolymers obtained by polymerizing or copolymerizing one or more monomers selected from the group consisting of aromatic alkenyl compounds, methacrylic esters, acrylic esters and cyanidated vinyl compounds, diene-aromatic alkenyl compound copolymers, vinyl cyanide-diene-aromatic alkenyl compound copolymers, aromatic alkenyl compound-diene-vinyl cyanide-N-phenylmaleimide copolymers, vinyl cyanide-(ethylene-diene-propylene (EPDM))-aromatic alkenyl compound copolymers, vinyl chloride resins, and chlorinated vinyl chloride resins. In addition, butadiene-methyl methacrylate copolymers of core-shell type can be included in such examples. These resins may be used alone or as combinations of two or more thereof.

<Manufacturing Method for Resin Composition>

A manufacturing method for each of resin compositions relating to embodiments of the invention has a process of preparing a resin composition containing e.g. a cellulose acetate and a polyhydroxyalkanoate. The manufacturing method preferably has a process of preparing a resin composition further containing a copolymer having olefin structural units and alkyl (meth)acrylate structural units.

Each of the resin compositions relating to embodiments of the invention is manufactured by melt-kneading a mixture of a cellulose acetate and a polyhydroxyalkanoate, optionally together with a copolymer having olefin structural units and alkyl (meth)acrylate structural units, a plasticizer and other ingredients. Alternatively, each of the resin compositions relating to embodiment of the invention may be manufactured by dissolving the ingredients as mentioned above in solvent.

As melt-kneading instruments, known instruments can be used, with examples including a twin-screw extruder, a Henschel mixer, a Banbury mixer, a single-screw extruder, a multi-screw extruder and a co-kneader.

<Resin Molding>

The resin moldings relating to embodiments of the invention contain the resin compositions relating to embodiments of the invention. More specifically, each resin molding is obtained by molding a resin composition which contains a cellulose acetate having a weight-average molecular weight of 30,000 to 90,000 and a substitution degree of 2.1 to 2.6, a polyhydroxyalkanoate, and besides, which optionally contains a copolymer having at least one kind of olefin structural units and alkyl (meth)acrylate structural units and being selected from the group consisting of olefin-alkyl (meth) acrylate copolymers and olefin-(meth)acrylate-(unsaturated-1,2-dicarboxylic acid anhydride) copolymers.

Of the resin compositions relating to embodiments of the invention, cases where the copolymers each having olefin structural units and alkyl (meth)acrylate structural units are olefin-alkyl (meth)acrylate copolymers are assumed to allow formation of resins in a state of interactions between acetyl groups of cellulose acetates and part of olefin-alkyl (meth) acrylate polymers in the resin compositions.

On the other hand, of the resin compositions relating to embodiments of the invention, cases where the copolymers each having olefin structural units and alkyl (meth)acrylate structural units are olefin-(meth)acrylate-(unsaturated-1,2-dicarboxylic anhydride) copolymers are assumed to allow formation of resins in a state of having covalent bonds through reactions between at least part of cellulose acetates and olefin-alkyl (meth)acrylate copolymers in the resin compositions.

As a molding method for the resin moldings relating to embodiments of the invention, injection molding is preferred in point of a high degree of flexibility in shape. In this point, the resin moldings are preferably injection moldings obtained by injection molding.

The cylinder temperature in injection molding is e.g. from 200° C. to 300° C., preferably from 240° C. to 280° C. The mold temperature in injection molding is e.g. from 40° C. to 90° C., preferably from 60° C. to 80° C.

The injection molding may be carried out using a commercially available machine, such as NEX500 made by NISSEI PLASTIC INDUSTRIAL CO., LTD., NEX150 made by NISSEI PLASTIC INDUSTRIAL CO., LTD., NEX70000 made by NISSEI PLASTIC INDUSTRIAL CO., LTD., PNX40 made by NISSEI PLASTIC INDUSTRIAL CO., LTD. or SE5OD made by Sumitomo Heavy Industries, Ltd.

The molding method for obtaining the resin moldings relating to embodiments of the invention is not limited to the foregoing injection molding, and thereto may be applied e.g. extrusion molding, blow molding, hot press molding, calender molding, coating molding, cast molding, dipping molding, vacuum molding and transfer molding.

The resin moldings relating to embodiments of the invention are used suitably for application to electrical-electronic instruments, office instruments, household electric appliances, car's interior materials, containers or so on. More specifically, they are used for cabinets of electrical-electronic instruments and household electric appliances, various parts of electrical-electronic instruments and household electric appliances, car's interior parts, storage cases for CD-ROM, DVD and the like, tableware, beverage bottles, food trays, wrapping materials, film, tarpaulin and so on.

[Examples]

The invention will now be illustrated in more detail by reference to the following examples, but it should not be construed as being limited to these examples. Additionally, all parts are by mass unless otherwise indicated.

<Preparation for Cellulose Acylates>
(Preparation for Cellulose Acetates)
—Synthesis of Cellulose Acetate (CA1)—

Acetylation: In order to perform acetylation of cellulose, 3 parts of cellulose powder (KC Floc W50, a product of NIPPON PAPER Chemicals Co., Ltd.), 0.15 parts of sulfuric acid, 30 parts of acetic acid and 6 parts of acetic anhydride were put into a reaction vessel, and stirred for 4 hours at 20° C.

Deacetylation and Decomposition into lower molecular-weight substance: Immediately after the completion of stirring, 3 parts of acetic acid and 1.2 parts of pure water were added to the solution having undergone the acetylation, and stirred for 30 minutes at 20° C. At the completion of stirring, the resulting solution was admixed with 4.5 parts of 0.2M aqueous solution of hydrochloric acid, heated up to 75° C., and stirred for 5 hours. The thus obtained solution was added dropwise to 200 parts of pure water over 2 hours, allowed to stand for 20 hours, and then passed through a filter having a pore size of 6 µm. Thus, 4 parts of white powder was obtained.

Washing: The thus obtained white powder was washed with pure water through the use of a filter press (SF(PP), made by KURITA MACHINERY MFG. Co., Ltd.) until the electric conductivity below 50 µS was attained. After the washing, the resulting powder was dried.

After-treatment: To the white powder after drying, 0.2 parts of calcium acetate and 30 parts of pure water were added, stirred for 2 hours at 25° C., and then subjected to filtration. The powder obtained through the filtration was dried for 72 hours at 60° C. to give about 2.5 parts of a cellulose acetate (CA1).

—Synthesis of Cellulose Acetate (CA2)—

A cellulose acetate (CA2) was obtained in the same manner as the cellulose acetate (CA1) was synthesized, except that the amount of sulfuric acid used for acetylation was changed from 0.15 parts to 0.10 parts.

—Synthesis of Cellulose Acetate (CA3)—

A cellulose acetate (CA3) was obtained in the same manner as the cellulose acetate (CA1) was synthesized, except that the amount of sulfuric acid used for the acetylation was changed from 0.15 parts to 0.01 parts.

—Synthesis of Cellulose Acetate (CA4)—

A cellulose acetate (CA4) was obtained in the same manner as the cellulose acetate (CA1) was synthesized, except that the stirring time in the stage of deacetylation and decomposition into a lower molecular-weight substance was changed from 5 hours to 7 hours.

—Synthesis of Cellulose Acetate (CA5)—

A cellulose acetate (CA5) was obtained in the same manner as the cellulose acetate (CA1) was synthesized, except that the stirring time in the stage of deacetylation and decomposition into a lower molecular-weight substance was changed from 5 hours to 4.5 hours.

—Synthesis of Cellulose Acetate (CA6)—

A cellulose acetate (CA6) was obtained in the same manner as the cellulose acetate (CA1) was synthesized, except that the deacetylation and the decomposition into a lower molecular-weight substance were performed after the solution obtained by the acetylation was allowed to stand for 16 hours at room temperature (25° C.)

—Synthesis of Cellulose Acetate (CA7)—

A cellulose acetate (CA7) was obtained in the same manner as the cellulose acetate (CA1) was synthesized, except that, in the stage of deacetylation and decomposition into a lower molecular-weight substance, the 5-hour stirring at 75° C. was changed to 7-hour stirring at 65° C.

—Synthesis of Cellulose Acetate (CA8)—

A cellulose acetate (CA8) was obtained in the same manner as the cellulose acetate (CA1) was synthesized, except that, in the stage of deacetylation and decomposition into a lower molecular-weight substance, the 5-hour stirring at 75° C. was changed to 4-hour stirring at 80° C.

—Preparation for Cellulose Acetate (CA9)—

A commercially available cellulose acetate (L50, a product of Daicel Corporation) was prepared for use as a cellulose acetate (CA9).

—Preparation for Cellulose Acetate (CA10)—

A commercially available cellulose acetate (L20, a product of Daicel Corporation) was prepared for use as a cellulose acetate (CA10).

(Preparation for Cellulose Propionate)
—Synthesis of Cellulose Propionate (CP1)—

A cellulose propionate (CP1) was obtained in the same manner as the cellulose acetate (CA1) was synthesized, except that the use of 2 parts of acetic anhydride in the acetylation was changed to use of 2.5 parts of propionic anhydride and the stirring time in the stage of deacetylation and decomposition into a lower molecular-weight substance was changed from 5 hours to 7 hours.
(Preparation for Cellulose Butyrate)
—Synthesis of Cellulose Butyrate (CB1)—
A cellulose butyrate (CB1) was obtained in the same manner as the cellulose acetate (CA1) was synthesized, except that the use of 2 parts of acetic anhydride in the acetylation was changed to use of 2.5 parts of butyric anhydride and the stirring time in the stage of deacetylation and decomposition into a lower molecular-weight substance was changed from 5 hours to 7 hours.
<Determination of Weight-Average Molecular Weight, Polymerization Degree and Substitution Degree>
Polymerization degree of a cellulose acetate is determined from weight-average molecular weight of the cellulose acetate under the following procedure.
The first thing to do is to measure the weight-average molecular weight of a cellulose acetate with a GPC system using a dimethylacetamide/lithium chloride=90/10 solution (GPC system: HLC-8320GPC made by Tosoh Corporation, column: TSKgel α-M) and calculate it in terms of polystyrene.
Estimation results of weight-average molecular weights (Mw) of the cellulose acetates synthesized in the foregoing manners and substitution degrees are summarized in Table 4. In addition, estimation results of weight-average molecular weights (Mw) and substitution degrees of the cellulose propionate and the cellulose butyrate are summarized in Table 5.

TABLE 4

| Cellulose Acetate No. | Weight-average molecular weight (Mw) | Substation degree |
| --- | --- | --- |
| CA1 | 78,900 | 2.25 |
| CA2 | 42,000 | 2.20 |
| CA3 | 88,100 | 2.45 |
| CA4 | 33,800 | 2.15 |
| CA5 | 92,100 | 2.55 |
| CA6 | 24,500 | 2.25 |
| CA7 | 89,000 | 2.65 |
| CA8 | 64,200 | 2.05 |
| CA9 | 155,000 | 2.41 |
| CA10 | 121,000 | 2.45 |

TABLE 5

| Cellulose propionate No. or Cellulose butyrate No. | Kind | Weight-average molecular weight (Mw) | Substitution degree |
| --- | --- | --- | --- |
| CP1 | Cellulose propionate | 88,000 | 2.48 |
| CB1 | Cellulose butyrate | 89,000 | 2.16 |

<Preparation for Polyhydroxyalkanoates>
(Preparation for Polyhydroxyalkanoates (HA1) to (HA4))
As polyhydroxyalkanoates (HA1) to (HA4), the following commercially available products were prepared.
AONILEX X13 1A was prepared as a polyhydroxyalkanoate (HA1), AONILEX X15 1A as a polyhydroxyalkanoate (HA2), and AONILEX X331N as a polyhydroxyalkanoate (HA3) (all of which are products of KANEKA CORPORATION).

In addition, BIOPOL (a product of Zeneca) was prepared as a polyhydroxyalkanoate (HA4).
The weight-average molecular weight of each of the prepared polyhydroxyalkanoates and the copolymerization ratio (by mole %) of hydroxyhexanoate to each polyhydroxyalkanoate are summarized in Table 6 below.

TABLE 6

| Polyhydroxyalkanoate No. | Kind | Weight-average molecular weight (Mw) | Copolymerization rate of hexanoate |
| --- | --- | --- | --- |
| HA1 | hydroxybutyratehexanoate | $6.0 \times 10^5$ | 6 mole % |
| HA2 | hydroxybutyratehexanoate | $6.0 \times 10^5$ | 11 mole % |
| HA3 | Hydroxybutyratehexanoate | $4.0 \times 10^5$ | 6 mole % |
| HA4 | hydroxybutyrate | $4.0 \times 10^5$ | 0 mole % |

<Preparation for Copolymers Each Having Olefin Structural Units and Alkyl Ester Structural Units>
(Preparation for Ethylene-Alkyl (Meth)acrylate Copolymers EA1 to EA3)
As ethylene-alkyl (meth)acrylate copolymers EA1 to EA3, the following commercially available products were prepared.
As ethylene-alkyl (meth)acrylate copolymer EA1, EA2 and EA3, ethylene-alkyl (meth)acrylate copolymers, LOTRYL29MA03, LOTRYL18MA02 and LOTRYL35BA320, were prepared, respectively (all of which are products of Arkema). (Preparation for Ethylene-Alkyl (Meth)acrylate -Maleic Anhydride Copolymer EAM1 to EAM5)
As ethylene-alkyl (meth)acrylate copolymer-maleic anhydride EAM1 to EAM5, the following commercially available products were prepared.
Ethylene-(meth)acrylate-maleic anhydride copolymers, LOTADER 8200, LOTADER 4210, LOTADER 4603 LOTADER 4700 and LOTADER 3430 (all of which are products of Arkema), were prepared as an ethylene-(meth)acrylate-maleic anhydride copolymer (EAM1), an ethylene-(meth)acrylate-maleic anhydride copolymer (EAM2), an ethylene-(meth)acrylate-maleic anhydride copolymer (EAM3), an ethylene-(meth)acrylate-maleic anhydride copolymer (EAM4) and an ethylene-(meth)acrylate-maleic anhydride copolymer (EAM5), respectively (all of which are products of Arkema).
The proportions (% by mass) of different kinds of structural units in each of the prepared ethylene-alkyl (meth)acrylate copolymers and the prepared ethylene-alkyl (meth)acrylate copolymer-maleic anhydride-copolymers are summarized in Table 7 below.
(Preparation for Propylene-Alkyl (Meth)acrylate Copolymer PA1)
In 1,000 parts by mass of acetone were dissolved 80 parts by mass of propylene monomer and 20 parts by mass of methyl acrylate monomer, 100 parts by mass of monomers in all, and thereto was added 0.1 parts by mass of azoisobutyronitrile. The resulting solution was stirred for 24 hours at 40° C., and then added dropwise to pure water. The thus formed precipitate was filtered off, and dried to give a propylene-alkyl (meth)acrylate copolymer (PA1).
The proportions (% by mass) of different kinds of structural units in the prepared propylene-alkyl (meth)acrylate copolymer (PA1) are summarized in Table 7.

(Preparation for Propylene-Alkyl (Meth)acrylate -Maleic Anhydride Copolymer PAM1)

In 1,000 parts by mass of acetone were dissolved 80 parts by mass of propylene monomer, 17 parts by mass of methyl acrylate monomer and 3 parts by mass of maleic anhydride monomer, 100 parts by mass of monomers in all, and thereto was added 0.1 parts by mass of azoisobutyronitrile. The resulting solution was stirred for 24 hours at 40° C., and then added dropwise to pure water. The thus formed precipitate was filtered off, and dried to give a propylene-alkyl (meth) acrylate-maleic anhydride copolymer (PAM1).

The proportions (% by mass) of different kinds of structural units in the prepared propylene-alkyl (meth)acrylate copolymer-maleic anhydride copolymer (PAM1) are summarized in Table 7.

TABLE 7

Olefin-Alkyl (Meth)acrylate Copolymer

| No. | Ethylene Proportion (% by mass) | Propylene Proportion (% by mass) | Alkyl (Meth)acrylate Kind | Proportion (% by mass) |
|---|---|---|---|---|
| EA1 | 71 | — | MA | 29 |
| EA2 | 82 | — | MA | 18 |
| EA3 | 65 | — | BA | 35 |
| PA1 | — | 80 | MA | 20 |

Olefin-Alkyl (Meth)acrylate-Maleic Anhydride Copolymer

| No. | Ethylene Proportion (% by mass) | Propylene Proportion (% by mass) | Alkyl (meth)acrylate Kind | Proportion (% by mass) | Maleic anhydride Proportion (% by mass) |
|---|---|---|---|---|---|
| EAM1 | 90.7 | — | EA | 6.5 | 2.8 |
| EAM2 | 89.9 | — | BA | 6.5 | 3.6 |
| EAM3 | 73.7 | — | MA | 26 | 0.3 |
| EAM4 | 69.7 | — | EA | 29 | 1.3 |
| EAM5 | 81.9 | — | MA | 15 | 3.1 |
| PAM1 | — | 80 | MA | 17 | 3 |

By the way, MA, EA and BA in Table 7 stands for methyl acrylate, ethyl acrylate and butyl acrylate, respectively.

<Plasticizer>
(Preparation for Plasticizers P1 to P3)

A commercially available adipic ester-containing compound plasticizer (DAIFATTY 101, a product of DAIHACHI CHEMICAL INDUSTRY Co., Ltd.) was prepared as a plasticizer (P1), a polyether ester plasticizer (RS-1000, a product of ADEKA CORPORATION) was prepared as a plasticizer (P2), and a condensed phosphoric ester-based plasticizer (PX200, a product of DAIHACHI CHEMICAL INDUSTRY CO., LTD.) was prepared as a plasticizer (P3).

EXAMPLES 1 TO 23 AND COMPARATIVE EXAMPLES 1 TO 10

—Kneading and Injection Molding—

Each of Resin compositions (in the form of pellets) was obtained by preparing ingredients so as to have contents as shown in Table 8, adjusting a cylinder temperature in accordance with the value as indicated in Table 8, and carrying out kneading by means of a twin-screw kneader (TEX41SS, made by TOSHIBA MACHINE CO., LTD.).

The thus obtained pellets were molded into an ISO multipurpose dumbbell (measurement part width 10 mm x thickness 4 mm) by using an injection molding machine (NEX140III, made by NISSEI PLASTIC INDUSTRIAL CO., LTD.) at such a cylinder temperature as not to cause an injection peak pressure greater than 180 MPa.

<Evaluations>
—Charpy Impact Strength—

Each of the thus obtained ISO multipurpose dumbbells was subjected to notching by the use of a notching tool (Notching machine, Toyo Seiki Seisaku-Sho, Ltd.), and Charpy impact strength thereof was measured by using a digital impact-resistance measuring instrument (Model DG-UB, made by Toyo Seiki Seisaku-Sho, Ltd.) and a method conforming to ISO-179-1. Results obtained are summarized in Table 8.

—Bending Elasticity Modulus—

Bending elasticity modulus measurements were made on test pieces of the thus obtained ISO multipurpose dumbbells by using a method conforming to ISO-178 and universal testing apparatus (Autograph AG-Xplus, made by SHIMADZU CORPORATION. Results obtained are summarized in Table 8.

TABLE 8

| | | Ingredients in Composition (content: parts by mass) | | | | | | Cylinder temperature (° C.) | | Charpy impact resisting strength (kJ/m$^2$) | Bending elasticity modulus (MPa) |
|---|---|---|---|---|---|---|---|---|---|---|---|
| | | AC (A) | | PHA (B) | | Mass ratio | Plasticizer (C) | | | | |
| Sorting | | Kind | Content | Kind | Content | (B)/(A) | Kind | Content | Kneading | Injection molding | | |
| Example 1 | | CA1 | 88 | HA1 | 2 | 0.02 | P1 | 10 | 210 | 220 | 10.6 | 3,600 |
| Example 2 | | CA1 | 88 | HA2 | 2 | 0.02 | P1 | 10 | 210 | 220 | 17.8 | 3,200 |
| Example 3 | | CA1 | 88 | HA3 | 2 | 0.02 | P1 | 10 | 210 | 220 | 18.2 | 3,600 |
| Example 4 | | CA1 | 85 | HA2 | 5 | 0.06 | P1 | 10 | 210 | 220 | 17.5 | 3,000 |
| Example 5 | | CA1 | 89.5 | HA2 | 0.5 | 0.006 | P1 | 10 | 210 | 220 | 16.8 | 3,200 |
| Example 6 | | CA1 | 82 | HA2 | 8 | 0.10 | P1 | 10 | 210 | 220 | 15.2 | 2,800 |
| Example 7 | | CA2 | 88 | HA3 | 2 | 0.02 | P1 | 10 | 210 | 220 | 17.8 | 3,600 |
| Example 8 | | CA3 | 88 | HA3 | 2 | 0.02 | P1 | 10 | 210 | 220 | 14.5 | 3,600 |
| Example 9 | | CA4 | 88 | HA3 | 2 | 0.02 | P1 | 10 | 210 | 220 | 14.8 | 3,600 |
| Example 10 | | CA1 | 88 | HA3 | 2 | 0.02 | P2 | 10 | 210 | 220 | 10.5 | 3,800 |
| Example 11 | | CA1 | 88 | HA3 | 2 | 0.02 | P3 | 10 | 210 | 220 | 16.6 | 3,500 |
| Example 12 | | CA1 | 83 | HA3 | 2 | 0.02 | P1 | 15 | 200 | 210 | 22.3 | 3,100 |
| Example 13 | | CA1 | 93 | HA3 | 2 | 0.02 | P1 | 5 | 220 | 230 | 14.8 | 4,100 |
| Example 14 | | CA1 | 98 | HA3 | 2 | 0.02 | | | 230 | 240 | 9.5 | 5,000 |
| Example 15 | | CA1 | 99.5 | HA3 | 0.5 | 0.005 | | | 230 | 240 | 9 | 5,400 |
| Example 16 | | CA1 | 91 | HA3 | 9 | 0.10 | | | 230 | 240 | 9.1 | 4,800 |

TABLE 8-continued

|  | Ingredients in Composition (content: parts by mass) | | | | | | Cylinder temperature (° C.) | | Charpy impact resisting strength (kJ/m²) | Bending elasticity modulus (MPa) |
|---|---|---|---|---|---|---|---|---|---|---|
|  | AC (A) | | PHA (B) | | Mass ratio | Plasticizer (C) | | | | |
| Sorting | Kind | Content | Kind | Content | (B)/(A) | Kind | Content | Kneading | Injection molding | | |
| Example 17 | CA1 | 89.6 | HA3 | 0.4 | 0.004 | P1 | 10 | 210 | 220 | 9.8 | 3,600 |
| Example 18 | CA1 | 81 | HA3 | 9 | 0.11 | P1 | 10 | 210 | 220 | 8.9 | 2,800 |
| Example 19 | CA1 | 99.6 | HA3 | 0.4 | 0.004 |  |  | 230 | 240 | 8 | 5,400 |
| Example 20 | CA1 | 90 | HA3 | 10 | 0.11 |  |  | 230 | 240 | 8 | 4,600 |
| Example 21 | CA1 | 88 | HA4 | 2 | 0.02 | P1 | 10 | 220 | 240 | 8 | 5,200 |
| Example 22 | CA1 | 89.6 | HA2 | 0.4 | 0.004 | P1 | 10 | 210 | 220 | 8.5 | 3,300 |
| Example 23 | CA1 | 81 | HA2 | 9 | 0.11 | P1 | 10 | 210 | 220 | 10.9 | 2,600 |
| Compar. Ex. 1 | CA1 | 90 |  |  | 0.00 | P1 | 10 | 210 | 220 | 1.8 | 5,600 |
| Compar. Ex. 2 | CA5 | 88 | HA3 | 2 | 0.02 | P1 | 10 | 210 | 220 | 5.3 | 3,400 |
| Compar. Ex. 3 | CA6 | 88 | HA3 | 2 | 0.02 | P1 | 10 | 210 | 220 | 5.4 | 3,200 |
| Compar. Ex. 4 | CA7 | 88 | HA3 | 2 | 0.02 | P1 | 10 | 230 | 240 | 4.8 | 3,400 |
| Compar. Ex. 5 | CA8 | 88 | HA3 | 2 | 0.02 | P1 | 10 | 230 | 240 | 4.2 | 3,500 |
| Compar. Ex. 6 | CA9 | 88 | HA3 | 2 | 0.02 | P1 | 10 | 240 | 240 | 5.2 | 3,200 |
| Compar. Ex. 7 | CA10 | 88 | HA3 | 2 | 0.02 | P1 | 10 | 240 | 240 | 5.2 | 3,300 |
| Compar. Ex. 8 | CP1 | 88 | HA3 | 2 | 0.02 | P1 | 10 | 180 | 180 | 18.6 | 1,800 |
| Compar. Ex. 9 | CB1 | 88 | HA3 | 2 | 0.02 | P1 | 10 | 180 | 180 | 16.5 | 1,500 |
| Compar. Ex. 10 | CA1 | 70 |  |  | 0.00 | P1 | 30 | 210 | 210 | 8.9 | 1,900 |

By the way, AC and PHA in Table 8 stand for cellulose acylate and polyhydroxyalkanoate, respectively.

As can be seen from the data in the above table, every Example yields good evaluation results on bending elasticity modulus and impact resisting strength as compared with every Comparative Example.

EXAMPLES 24 TO 60 AND COMPARATIVE EXAMPLES 11 TO 23

—Kneading and Injection Molding—

Each of resin compositions (in the form of pellets) was obtained by preparing ingredients so as to have contents as shown in Table 9 and Table 10, adjusting a cylinder temperature in accordance with the value as indicated in Table 9 and Table 10, and carrying out kneading by means of a twin-screw kneader (TEX41SS, made by TOSHIBA MACHINE CO., LTD.). By the way, the content of each individual ingredient prepared for each composition is expressed on a base of 100 parts by mass of cellulose acylate (100 parts by mass of cellulose acetate, 100 parts by mass of cellulose propionate or 100 parts by mass of cellulose butyrate). Additionally, PA1 was used in Example 40, PAM1 was used in Example 41, and in Example 42, 2 pars of EA1 and 2 parts of EMA1 were used in combination.

The thus obtained pellets were molded into an ISO multipurpose dumbbell (measurement part width 10 mm×thickness 4 mm) by using an injection molding machine (NEX140III, made by NISSEI PLASTIC INDUSTRIAL CO., LTD.) at such a cylinder temperature as not to cause an injection peak pressure greater than 180 MPa.

<Evaluations>

—Flowability—

Flowability evaluation was made on each of the resin compositions (in the form of pellets) obtained above by means of a capillary flowmeter (CAPILOGRAPH 1D, made by Toyo Seiki Seishaku-Sho, LTD.). The flowability evaluation was made by measuring the melt viscosity at a cylinder temperature 220° C. and a shear velocity of 1,216 sec$^{-1}$. The lower the melt viscosity, the better the flowability. Measurement results are shown in Table 9 and Table 10.

—Heat resistance—

Heat distortion temperature measurement under a load of 1.8 MPa was made on each of test pieces of the ISO multipurpose dumbbells obtained above by using a HDT tester (HDT-3, made by Toyo Seiki Seisaku-Sho, Ltd.) and a method conforming to ISO75-2. Results obtained are shown in Table 9 and Table 10.

TABLE 9

|  | Ingredients in Composition (content: parts by mass) | | | | | | | | | Cylinder temperature (° C.) | | Melt viscosity (Pa · s) | Heat distortion temperature (° C.) |
|---|---|---|---|---|---|---|---|---|---|---|---|---|---|
|  | AC (A) | PHA (B) | | EA or EAM (C) | | Mass ratio | Mass ratio | Plasticizer (D) | | | | | |
| Sorting | Kind | Kind | Content | Kind | content | (B)/(A) | (C)/(A) | Kind | Content | Kneading | Injection molding | | |
| Example 24 | CA1 | HA2 | 5 | EA1 | 2 | 0.05 | 0.02 | P1 | 10 | 210 | 220 | 215 | 80 |
| Example 25 | CA2 | HA2 | 5 | EA1 | 2 | 0.05 | 0.02 | P1 | 10 | 210 | 220 | 210 | 79 |
| Example 26 | CA3 | HA2 | 5 | EA1 | 2 | 0.05 | 0.02 | P1 | 10 | 210 | 220 | 245 | 80 |
| Example 27 | CA4 | HA2 | 5 | EA1 | 2 | 0.05 | 0.02 | P1 | 10 | 210 | 220 | 183 | 75 |
| Example 28 | CA1 | HA1 | 5 | EA1 | 2 | 0.05 | 0.02 | P1 | 10 | 210 | 220 | 255 | 86 |
| Example 29 | CA1 | HA3 | 2 | EA1 | 2 | 0.02 | 0.02 | P1 | 10 | 210 | 220 | 190 | 84 |
| Example 30 | CA1 | HA2 | 5 | EA2 | 2 | 0.05 | 0.02 | P1 | 10 | 210 | 220 | 210 | 78 |
| Example 31 | CA1 | HA2 | 5 | EA3 | 2 | 0.05 | 0.02 | P1 | 10 | 210 | 220 | 208 | 75 |
| Example 32 | CA1 | HA2 | 5 | EAM1 | 2 | 0.05 | 0.02 | P1 | 10 | 210 | 220 | 225 | 85 |

TABLE 9-continued

| | Ingredients in Composition (content: parts by mass) | | | | | | | | | Cylinder temperature (° C.) | | Melt viscosity (Pa·s) | Heat distortion temperature (° C.) |
|---|---|---|---|---|---|---|---|---|---|---|---|---|---|
| | AC (A) | PHA (B) | | EA or EAM (C) | | Mass ratio (B)/(A) | Mass ratio (C)/(A) | Plasticizer (D) | | | | | |
| Sorting | Kind | Kind | Content | Kind | content | | | Kind | Content | Kneading | Injection molding | | |
| Example 33 | CA1 | HA2 | 5 | EAM2 | 2 | 0.05 | 0.02 | P1 | 10 | 210 | 220 | 223 | 86 |
| Example 34 | CA1 | HA2 | 5 | EAM3 | 2 | 0.05 | 0.02 | P1 | 10 | 210 | 220 | 225 | 83 |
| Example 35 | CA1 | HA2 | 5 | EAM4 | 2 | 0.05 | 0.02 | P1 | 10 | 210 | 220 | 220 | 87 |
| Example 36 | CA1 | HA2 | 5 | EAM5 | 2 | 0.05 | 0.02 | P1 | 10 | 210 | 220 | 224 | 85 |
| Example 37 | CA1 | HA2 | 0.5 | EA1 | 2 | 0.005 | 0.02 | P1 | 10 | 210 | 220 | 250 | 80 |
| Example 38 | CA1 | HA2 | 10 | EA1 | 2 | 0.10 | 0.02 | P1 | 5 | 210 | 220 | 205 | 77 |
| Example 39 | CA1 | HA2 | 5 | EA1 | 0.5 | 0.05 | 0.005 | P1 | 10 | 210 | 220 | 245 | 80 |
| Example 40 | CA1 | HA2 | 5 | EA1 | 10 | 0.05 | 0.10 | P1 | 10 | 210 | 220 | 235 | 75 |
| Example 61 | CA1 | HA2 | 5 | EAM1 | 0.5 | 0.05 | 0.005 | P1 | 10 | 210 | 220 | 278 | 90 |
| Example 62 | CA1 | HA2 | 5 | EAM1 | 10 | 0.05 | 0.10 | P1 | 10 | 210 | 220 | 198 | 80 |
| Example 41 | CA1 | HA2 | 5 | EA1 | 2 | 0.05 | 0.02 | P2 | 10 | 210 | 220 | 210 | 76 |
| Example 42 | CA1 | HA2 | 5 | EA1 | 2 | 0.05 | 0.02 | P3 | 10 | 210 | 220 | 285 | 78 |
| Example 43 | CA1 | HA2 | 5 | EA1 | 2 | 0.05 | 0.02 | | | 230 | 240 | 325 | 92 |
| Example 44 | CA2 | HA2 | 5 | EA1 | 2 | 0.05 | 0.02 | | | 230 | 240 | 318 | 89 |
| Example 45 | CA3 | HA2 | 5 | EA1 | 2 | 0.05 | 0.02 | | | 230 | 240 | 320 | 88 |
| Example 46 | CA4 | HA2 | 5 | EA1 | 2 | 0.05 | 0.02 | | | 230 | 240 | 315 | 87 |
| Example 47 | CA1 | HA1 | 5 | EA1 | 2 | 0.05 | 0.02 | | | 230 | 240 | 330 | 93 |
| Example 48 | CA1 | HA3 | 2 | EA1 | 2 | 0.02 | 0.02 | | | 230 | 240 | 305 | 95 |
| Example 49 | CA1 | HA2 | 5 | EA2 | 2 | 0.05 | 0.02 | | | 230 | 240 | 295 | 88 |
| Example 50 | CA1 | HA2 | 5 | EA3 | 2 | 0.05 | 0.02 | | | 230 | 240 | 315 | 85 |
| Example 51 | CA1 | HA2 | 5 | EAM1 | 2 | 0.05 | 0.02 | | | 230 | 240 | 322 | 87 |
| Example 52 | CA1 | HA2 | 5 | EAM2 | 2 | 0.05 | 0.02 | | | 230 | 240 | 305 | 85 |
| Example 53 | CA1 | HA2 | 5 | EAM3 | 2 | 0.05 | 0.02 | | | 230 | 240 | 300 | 86 |
| Example 54 | CA1 | HA2 | 5 | EAM4 | 2 | 0.05 | 0.02 | | | 230 | 240 | 315 | 87 |
| Example 55 | CA1 | HA2 | 5 | EAM5 | 2 | 0.05 | 0.02 | | | 230 | 240 | 320 | 88 |
| Example 63 | CA1 | HA2 | 5 | PA1 | 2 | 0.05 | 0.02 | P1 | 10 | 190 | 200 | 85 | 80 |
| Example 64 | CA1 | HA2 | 5 | PAM1 | 2 | 0.05 | 0.02 | P1 | 10 | 200 | 210 | 195 | 82 |
| Example 65 | CA1 | HA2 | 5 | EA1, EAM1 | 2, 2 | 0.05 | 0.04 | P1 | 10 | 210 | 220 | 258 | 84 |
| Example 56 | CA1 | HA2 | 0.3 | EA1 | 2 | 0.003 | 0.02 | P1 | 10 | 220 | 230 | 455 | 75 |
| Example 57 | CA1 | HA2 | 12 | EA1 | 2 | 0.12 | 0.02 | P1 | 10 | 200 | 210 | 435 | 70 |
| Example 58 | CA1 | HA2 | 5 | EA1 | 0.3 | 0.05 | 0.003 | P1 | 10 | 220 | 230 | 395 | 70 |
| Example 59 | CA1 | HA2 | 5 | EA1 | 12 | 0.05 | 0.12 | P1 | 10 | 210 | 220 | 335 | 70 |
| Example 60 | CA1 | HA4 | 5 | EA1 | 2 | 0.05 | 0.02 | P1 | 10 | 220 | 230 | 452 | 85 |

TABLE 10

| | Ingredients in Composition (content: parts by mass) | | | | | | | | | Cylinder temperature (° C.) | | Melt viscosity (Pa·s) | Heat distortion temperature (° C.) |
|---|---|---|---|---|---|---|---|---|---|---|---|---|---|
| | AC (A) | PHA (B) | | EA or EAM (C) | | Mass ratio (B)/(A) | Mass ratio (C)/(A) | Plasticizer (D) | | | | | |
| Sorting | Kind | Kind | Content | Kind | content | | | Kind | Content | Kneading | Injection molding | | |
| Compar. Ex. 11 | CA1 | | | | | 0 | 0 | P1 | 10 | 240 | 250 | 1,550 | 110 |
| Compar. Ex. 12 | CA1 | HA2 | 5 | | | 0.05 | 0 | P1 | 10 | 220 | 230 | 405 | 65 |
| Compar. Ex. 13 | CA1 | | | EA1 | 2 | 0 | 0.02 | P1 | 10 | 230 | 240 | 452 | 63 |
| Compar. Ex. 14 | CA5 | HA2 | 5 | EA1 | 2 | 0.05 | 0.02 | P1 | 10 | 220 | 230 | 498 | 66 |
| Compar. Ex. 15 | CA6 | HA2 | 5 | EA1 | 2 | 0.05 | 0.02 | P1 | 10 | 220 | 230 | 353 | 65 |
| Compar. Ex. 16 | CA7 | HA2 | 5 | EA1 | 2 | 0.05 | 0.02 | P1 | 10 | 230 | 240 | 1,050 | 78 |
| Compar. Ex. 17 | CA8 | HA2 | 5 | EA1 | 2 | 0.05 | 0.02 | P1 | 10 | 230 | 240 | 990 | 77 |
| Compar. Ex. 18 | CA9 | HA2 | 5 | EA1 | 2 | 0.05 | 0.02 | P1 | 10 | 230 | 240 | 1,250 | 65 |
| Compar. Ex. 19 | CA10 | HA2 | 5 | EA1 | 2 | 0.05 | 0.02 | P1 | 10 | 230 | 240 | 850 | 62 |
| Compar. Ex. 20 | CP1 | HA2 | 5 | EA1 | 2 | 0.05 | 0.02 | P1 | 10 | 200 | 210 | 112 | 48 |
| Compar. Ex. 21 | CB1 | HA2 | 5 | EA1 | 2 | 0.05 | 0.02 | P1 | 10 | 200 | 210 | 108 | 41 |

TABLE 10-continued

| | Ingredients in Composition (content: parts by mass) | | | | | | | | | Cylinder temperature (° C.) | | Melt viscosity (Pa · s) | Heat distortion temperature (° C.) |
|---|---|---|---|---|---|---|---|---|---|---|---|---|---|
| | AC (A) | PHA (B) | | EA or EAM (C) | | Mass ratio | Mass ratio | Plasticizer (D) | | | | | |
| Sorting | Kind | Kind | Content | Kind | content | (B)/(A) | (C)/(A) | Kind | Content | Kneading | Injection molding | | |
| Compar. Ex. 22 | CP1 | HA2 | 5 | EA1 | 2 | 0.05 | 0.02 | | | 220 | 230 | 248 | 50 |
| Compar. Ex. 23 | CB1 | HA2 | 5 | EA1 | 2 | 0.05 | 0.02 | | | 200 | 230 | 285 | 45 |

In Table 9 and Table 10, AC stands for a cellulose acylate, PHA stands for a polyhydroxyalkanoate, EA or EAM stands for an ethylene-alkyl (meth)acrylate copolymer or an ethylene-alkyl (meth)acrylate copolymer-maleic anhydride copolymer, respectively. However, EA or EAM in Examples 40 and 41 stand for a propylene-alkyl (meth)acrylate copolymer or a propylene-alkyl (meth)acrylate copolymer-maleic anhydride copolymer, respectively.

As can be seen from the experimental data given in the above tables, every Example yields good evaluation results on flowability and heat resistance as compared with every Comparative Example.

What is claimed is:

1. A resin composition, comprising:
   a cellulose acetate having a weight-average molecular weight of 30,000 to 90,000 and a substitution degree of 2.1 to 2.6; and
   a polyhydroxyalkanoate.

2. The resin composition according to claim 1, wherein when (A) represents a percentage by mass of cellulose acetate content on the whole quantity of the resin composition and (B) represents a percentage by mass of polyhydroxyalkanoate content on the whole quantity of the resin composition, a mass ratio (B)/(A) is from 0.005 to 0.1.

3. The resin composition according to claim 1, wherein the polyhydroxyalkanoate is a copolymer of 3-hydroxybutyrate and 3-hydroxyhexanoate.

4. The resin composition according to claim 3, wherein a composition ratio of the 3-hydroxyhexanoate to the copolymer of the 3-hydroxybutyrate and the 3-hydroxyhexanoate is from 3 mole % to 20 mole %.

5. The resin composition according to claim 1, further comprising an adipic ester.

6. A resin molding that is molded from the resin composition according to claim 1.

7. The resin molding according to claim 6, that is a product of injection molding.

8. A resin composition, comprising:
   a cellulose acetate having a weight-average molecular weight of 30,000 to 90,000 and a substitution degree of 2.1 to 2.6;
   a polyhydroxyalkanoates; and
   at least one copolymer having olefin structural units and alkyl (meth)acrylate structural units, the copolymer being selected from the group consisting of olefin-alkyl (meth)acrylate copolymers and olefin-(meth)acrylate-(unsaturated 1,2-dicarboxylic anhydride) copolymers.

9. The resin composition according to claim 8, wherein the copolymer having olefin structural units and alkyl (meth)acrylate structural units is an olefin-alkyl (meth)acrylate copolymer.

10. The resin composition according to claim 9, wherein the olefin-alkyl (meth)acrylate copolymer is an ethylene-alkyl (meth)acrylate copolymer.

11. The resin composition according to claim 8, wherein the copolymer having olefin structural units and alkyl (meth)acrylate structural units is an olefin-(meth)acrylate-(unsaturated 1,2-dicarboxylic anhydride) copolymer.

12. The resin composition according to claim 11, wherein the olefin-(meth)acrylate-(unsaturated 1,2-dicarboxylic anhydride) copolymer is an ethylene-(meth)acrylate-maleic anhydride copolymer.

13. The resin composition according to claim 8, wherein when (A) represents a percentage by mass of cellulose acetate content on the whole quantity of the resin composition and (B) represents a percentage by mass of polyhydroxyalkanoate content on the whole quantity of the resin composition, a mass ratio (B)/(A) is from 0.005 to 0.1.

14. The resin composition according to claim 8, wherein when (A) represents a percentage by mass of cellulose acetate content on the whole quantity of the resin composition and (C) represents a percentage by mass of total content of copolymers each having olefin structural units and alkyl (meth)acrylate structural units on the whole quantity of the resin composition, a mass ratio (C)/(A) is from 0.005 to 0.1.

15. The resin composition according to claim 8, wherein the polyhydroxyalkanoate is a copolymer of 3-hydroxybutyrate and 3-hydroxyhexanoate.

16. The resin composition according to claim 15, wherein a composition ratio of the 3-hydroxyhexanoate to the copolymer of the 3-hydroxybutyrate and the 3-hydroxyhexanoate is from 3 mole % to 20 mole %.

17. The resin composition according to claim 8, further comprising a plasticizer.

18. The resin composition according to claim 17, wherein the plasticizer is an adipic ester.

19. A resin molding that is molded from the resin composition according to claim 8.

20. The resin molding according to claim 19, that is a product of injection molding.

* * * * *